United States Patent
Goldfarb et al.

(10) Patent No.: US 10,713,498 B2
(45) Date of Patent: *Jul. 14, 2020

(54) SYSTEM AND METHOD FOR ASSOCIATING AN IDENTIFIER OF A MOBILE COMMUNICATION TERMINAL WITH A PERSON-OF-INTEREST, USING VIDEO TRACKING

(71) Applicant: Verint Systems Ltd., Herzliya Pituach (IL)

(72) Inventors: Eithan Goldfarb, Ness Ziona (IL); Boaz Dudovich, Rehovot (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,776

(22) Filed: Aug. 5, 2019

(65) Prior Publication Data

US 2020/0042798 A1 Feb. 6, 2020

Related U.S. Application Data

(63) Continuation of application No. 15/714,878, filed on Sep. 25, 2017, now Pat. No. 10,372,999.

(30) Foreign Application Priority Data

Sep. 26, 2016 (IL) .......................................... 248062

(51) Int. Cl.
*G06K 9/00* (2006.01)
*G06T 7/292* (2017.01)
(Continued)

(52) U.S. Cl.
CPC .......... *G06K 9/00771* (2013.01); *G06T 7/292* (2017.01); *H04N 7/181* (2013.01);
(Continued)

(58) Field of Classification Search
CPC ................ G06K 9/00771; G06T 7/292; G06T 2207/10016; G06T 2207/30196; H04W 4/029; H04N 7/181
See application file for complete search history.

(56) References Cited

U.S. PATENT DOCUMENTS 6,526,158 B1 2/2003 Goldberg
6,950,521 B1 9/2005 Marcovici et al.
(Continued)

FOREIGN PATENT DOCUMENTS

WO 2010/116292 10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
(Continued)

*Primary Examiner* — Shefali D Goradia
(74) *Attorney, Agent, or Firm* — Meunier Carlin & Curfman LLC

(57) ABSTRACT

A plurality of pairs of video cameras and interrogation devices may be placed in a public place along various paths that a person-of-interest might be expected to move. The person-of-interest is then located in multiple images acquired, collectively, by multiple video cameras. From each of the interrogation devices that are paired with these video cameras, a subset of the captured identifiers is obtained. Candidate identifiers are then restricted to those identifiers that are included in each of the subsets. A given identifier may be rejected as a candidate identifier. To automatically locate the person-of-interest in the images acquired by the "paired" video cameras, a processor may utilize video-tracking techniques to automatically track the
(Continued)

person-of-interest, such that the person-of-interest is not "lost." By virtue of utilizing such tracking techniques, the person-of-interest may be repeatedly located automatically, and with minimal chance of a false detection.

20 Claims, 2 Drawing Sheets

(51) Int. Cl.
  *H04W 4/029* (2018.01)
  *H04N 7/18* (2006.01)
(52) U.S. Cl.
  CPC ... *H04W 4/029* (2018.02); *G06T 2207/10016* (2013.01); *G06T 2207/10024* (2013.01); *G06T 2207/30196* (2013.01); *G06T 2207/30232* (2013.01); *G06T 2207/30241* (2013.01)

(56) References Cited

U.S. PATENT DOCUMENTS

| | | | |
|---|---|---|---|
| 7,023,356 | B2 | 4/2006 | Burkhardt et al. |
| 7,374,096 | B2 | 5/2008 | Overhultz et al. |
| 8,215,546 | B2 | 7/2012 | Lin et al. |
| 8,351,900 | B2 | 1/2013 | Lotvonen et al. |
| 8,496,169 | B2 | 7/2013 | Christofferson |
| 9,385,865 | B2 | 7/2016 | Wix et al. |
| 9,454,728 | B1 | 9/2016 | Bender et al. |
| 2003/0222820 | A1 | 12/2003 | Karr et al. |
| 2005/0239478 | A1 | 10/2005 | Spirito |
| 2008/0150698 | A1 | 6/2008 | Smith et al. |
| 2008/0167049 | A1 | 7/2008 | Karr et al. |
| 2009/0036143 | A1 | 2/2009 | Martin et al. |
| 2009/0172397 | A1 | 7/2009 | Kim |
| 2010/0078475 | A1 | 4/2010 | Lin et al. |
| 2011/0028162 | A1 | 2/2011 | Hazzani |
| 2011/0080267 | A1 | 4/2011 | Clare et al. |
| 2011/0150211 | A1 | 6/2011 | Anderson |
| 2012/0075168 | A1 | 3/2012 | Osterhout et al. |
| 2012/0086555 | A1 | 4/2012 | Nelkenbaum |
| 2012/0256730 | A1 | 10/2012 | Scott et al. |
| 2013/0266181 | A1* | 10/2013 | Brewer .............. G06K 9/00302 382/103 |
| 2013/0342652 | A1* | 12/2013 | Kikkeri .................. B25J 9/104 348/46 |
| 2014/0148196 | A1 | 5/2014 | Bassan-Eskenazi et al. |
| 2014/0160955 | A1 | 6/2014 | Lum et al. |
| 2015/0116501 | A1* | 4/2015 | McCoy .............. H04N 5/23206 348/169 |
| 2016/0182460 | A1 | 6/2016 | Alexander et al. |
| 2017/0310486 | A1 | 10/2017 | Goldfarb |

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

Barkan, E.P., "Cryptanalysis of Ciphers and Protocols," Research Thesis submitted to the Senate of the Technion, Israel Institute of Technology, 2006, 200 pages.

"Cell Scanning and Catcher Detection in unnoticeable pocket size," NetHawk C2, Data sheet, version 1.4, EXFO, 2010, 4 pages.

Cellusys, "SS7 Vulnerabilities," e-book, 2016, 53 pages.

Engel, T., "SS7: Locate. Track. Manipulate." 2014, 55 pages.

Girardin, F., et al., "Detecting air travel to survey passengers on a worldwide scale," Journal of Location Based Services, 2010, 26 pages.

Kostrzewa, A., "Development of a man in the middle attack on the GSM Um-Interface," Master Thesis, 2011, 88 pages.

Meyer, U., et al., "On the Impact of GSM Encryption and Man-in-the-Middle Attacks on the Security of Interoperating GSM/UMTS Networks," proceedings of the 15th IEEE International Symposium on Personal, Indoor and Mobile Radio Communications, 2004, pp. 2876-2883.

Mourad, H., "The Fall of SS7—How Can the Critical Security Controls Help?" The SANS Institute, 2015, 29 pages.

Nohl, K., "Mobile self-defense," Security Research Labs, 2015, 24 pages.

Radiator, EAP-SIM, EAP-AKA and EAP-AKA' Support, White Paper, Open System Consultants Pty.Ltd., 2014, 17 pages.

Signaling System 7 (SS7) Security Report, Positive Technologies, 2014, 15 pages.

Strobel, D., "IMSI Catcher," Seminararbeit, Ruhr-Universität Bochum, 2007, pp. 13-24.

Vedaldi, A., "An implementation of SIFT detector and descriptor," University of California at Los Angeles, 2007, 7 pages.

Vezzani, R., et al., "People Re-identification in Surveillance and Forensics: A Survey," ACM Computing Surveys, vol. 1, No. 1, Article 1, 2013, 36 pages.

* cited by examiner

SYSTEM AND METHOD FOR ASSOCIATING AN IDENTIFIER OF A MOBILE COMMUNICATION TERMINAL WITH A PERSON-OF-INTEREST, USING VIDEO TRACKING

CROSS-REFERENCE TO RELATED APPLICATION

The present disclosure is a continuation of U.S. patent application Ser. No. 15/714,878, filed Sep. 25, 2017, which is incorporated herein by reference in its entirety.

FIELD OF THE DISCLOSURE

The present disclosure relates generally to the field of surveillance and monitoring, and particularly, to video surveillance combined with communication monitoring.

BACKGROUND OF THE DISCLOSURE

Interrogation devices that solicit mobile communication terminals by imitating the operation of a legitimate base station are sometimes referred to as "International Mobile Subscriber Identity (IMSI) catchers." Examples of IMSI catching techniques are described, for example, by Strobel in "IMSI Catcher," Jul. 13, 2007, which is incorporated herein by reference, by Asokan et al., in "Man-in-the-Middle Attacks in Tunneled Authentication protocols," the 2003 Security Protocols Workshop, Cambridge, UK, Apr. 2-4, 2003, which is incorporated herein by reference, and by Meyer and Wetzel in "On the Impact of GSM Encryption and Man-in-the-Middle Attacks on the Security of Interoperating GSM/UMTS Networks," proceedings of the $15^{th}$ IEEE International Symposium on Personal, Indoor and Mobile Radio Communications, Barcelona, Spain, Sep. 5-8, 2004, pages 2876-2883, which is incorporated herein by reference.

U.S. Pat. No. 9,247,216, whose disclosure is incorporated herein by reference, describes a system having interfaces to receive images from one or more cameras, and location information with respect to wireless communication terminals. A notification may be received regarding an individual observed in the images. Next, wireless communication terminals located in a vicinity of the individual may be identified. From the identified wireless communication terminals, identification information applicable to the individual may be obtained. The identification information may be, e.g., personal information related to a subscriber of the given wireless communication terminal.

U.S. Pat. No. 9,025,833, whose disclosure is incorporated herein by reference, describes methods and systems for identifying and tracking individuals in an area-of-interest that may be covered by a video surveillance subsystem and by a communication location subsystem, and a correlation system that correlates the outputs of the two subsystems. The communication location subsystem may monitor communication of mobile phones. The video subsystem captures video images of the area-of-interest, and processes the video images so as to identify individuals who are present in the area. The correlation system correlates a given mobile phone with a given individual who was identified by the video subsystem as being engaged in a phone conversation. After correlating the mobile phone with the individual using the phone, the correlation system outputs correlated information regarding the phone and its user to an operator.

SUMMARY OF THE DISCLOSURE

There is provided, in accordance with some embodiments of the present invention, a system that includes a network interface and a processor. The processor is configured to receive, via the network interface, a plurality of identifiers of mobile communication terminals that were obtained, collectively, by a plurality of interrogation devices at respective identifier-times, each interrogation device of the interrogation devices being paired with a respective one of at least some of a plurality of video cameras, in that the interrogation device covers an area that is covered by the respective one of the at least some of the video cameras. The processor is further configured to, by tracking a person-of-interest over a plurality of images that were acquired, collectively, by the plurality of video cameras, identify a plurality of visible-times, at each of which the person-of-interest was visible to one of the at least some of the video cameras. The processor is further configured to, based on the visible-times and the identifier-times, identify at least one of the identifiers that is more likely than any of the other identifiers to belong to one of the mobile communication terminals that is carried by the person-of-interest, and to generate an output that includes the at least one of the identifiers.

In some embodiments, the processor is further configured to receive, from a user, an indication that a person appearing in one of the images is the person-of-interest, and the processor is configured to track the person-of-interest responsively to the indication.

In some embodiments, the processor is configured to track the person-of-interest by:
  extracting features of the person-of-interest from the one of the images, and
  tracking the person-of-interest by identifying the features in others of the images.

In some embodiments, the processor is configured to track the person-of-interest by:
  by processing at least some of the images that were acquired by a first one of the video cameras, identifying that the person-of-interest is moving, in the at least some of the images that were acquired by the first one of the video cameras, toward a second one of the video cameras, and
  in response thereto, processing at least some of the images that were acquired by the second one of the video cameras, such as to locate the person-of-interest in the at least some of the images that were acquired by the second one of the video cameras.

In some embodiments, the processor is configured to track the person-of-interest by:
  by processing at least some of the images that were acquired by a first one of the video cameras, estimating a speed at which the person-of-interest is moving in the at least some of the images that were acquired by the first one of the video cameras,
  in response to the estimated speed, selecting a subset of images that were acquired by a second one of the video cameras, and
  processing the subset, such as to locate the person-of-interest in the subset.

In some embodiments, the processor is configured to identify the at least one of the identifiers in response to the at least one of the identifiers having been obtained, from each interrogation device of at least some of the interrogation devices, within a particular interval of any one of the visible-times at which the person-of-interest was visible to the one of the video cameras that is paired with the interrogation device.

In some embodiments, the processor is configured to identify the at least one of the identifiers in response to the at least one of the identifiers having been obtained, from each interrogation device of at least some of the interrogation devices, within a particular interval of a first one of the visible-times at which the person-of-interest was visible to the one of the video cameras that is paired with the interrogation device.

In some embodiments, the processor is configured to identify the at least one of the identifiers by ascertaining that at least one of the other identifiers is unlikely to belong to the one of the mobile communication terminals that is carried by the person-of-interest.

In some embodiments, the processor is configured to ascertain that the at least one of the other identifiers is unlikely to belong to the one of the mobile communication terminals that is carried by the person-of-interest by ascertaining that the person-of-interest was not visible to one of the video cameras within a particular interval of one of the identifier-times at which the at least one of the other identifiers was obtained by one of the interrogation devices that is paired with the one of the video cameras.

In some embodiments, the processor is configured to ascertain that the at least one of the other identifiers is unlikely to belong to the one of the mobile communication terminals that is carried by the person-of-interest by ascertaining that the person-of-interest was visible to one of the video cameras within a particular interval of one of the identifier-times at which the at least one of the other identifiers was obtained by one of the interrogation devices that is not paired with the one of the video cameras.

There is further provided, in accordance with some embodiments of the present invention, a method that includes receiving, by a processor, a plurality of identifiers of mobile communication terminals that were obtained, collectively, by a plurality of interrogation devices at respective identifier-times, each interrogation device of the interrogation devices being paired with a respective one of at least some of a plurality of video cameras, in that the interrogation device covers an area that is covered by the respective one of the at least some of the video cameras. The method further includes, by automatically tracking a person-of-interest over a plurality of images that were acquired, collectively, by the plurality of video cameras, identifying a plurality of visible-times, at each of which the person-of-interest was visible to one of the at least some of the video cameras. The method further includes, based on the visible-times and the identifier-times, identifying at least one of the identifiers that is more likely than any of the other identifiers to belong to one of the mobile communication terminals that is carried by the person-of-interest, and generating an output that includes the at least one of the identifiers.

There is further provided, in accordance with some embodiments of the present invention, a computer software product including a tangible non-transitory computer-readable medium in which program instructions are stored. The instructions, when read by a processor, cause the processor to receive a plurality of identifiers of mobile communication terminals that were obtained, collectively, by a plurality of interrogation devices at respective identifier-times, each interrogation device of the interrogation devices being paired with a respective one of at least some of a plurality of video cameras, in that the interrogation device covers an area that is covered by the respective one of the at least some of the video cameras. The instructions further cause the processor to identify, by tracking a person-of-interest over a plurality of images that were acquired, collectively, by the plurality of video cameras, a plurality of visible-times, at each of which the person-of-interest was visible to one of the at least some of the video cameras. The instructions further cause the processor to identify, based on the visible-times and the identifier-times, at least one of the identifiers that is more likely than any of the other identifiers to belong to one of the mobile communication terminals that is carried by the person-of-interest, and to generate an output that includes the at least one of the identifiers.

The present disclosure will be more fully understood from the following detailed description of embodiments thereof, taken together with the drawings, in which:

DETAILED DESCRIPTION OF EMBODIMENTS

Overview

Figure 1:
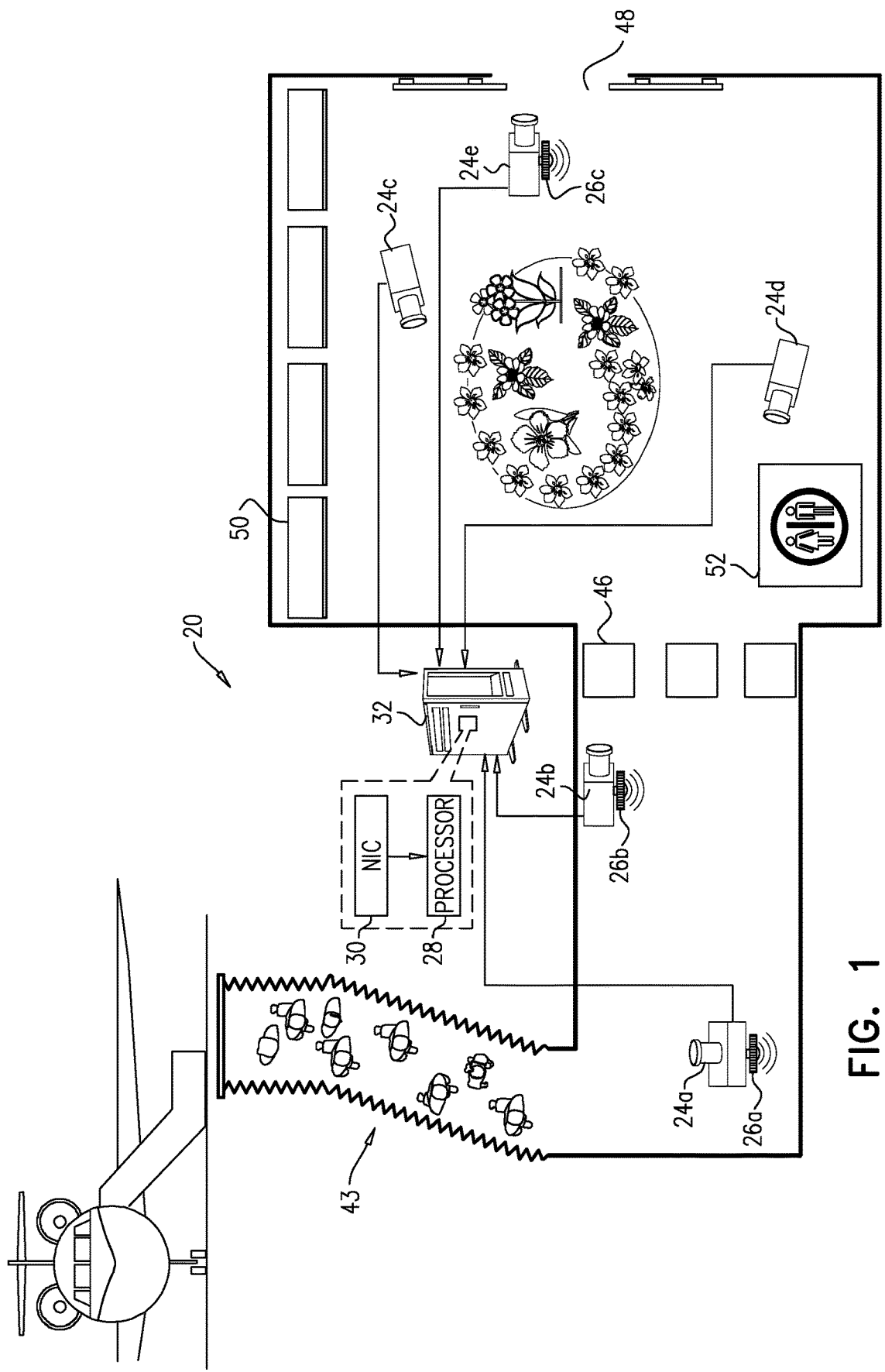
FIG. 1 is a schematic illustration of a system for associating a person-of-interest with an identifier of a mobile communication terminal, in accordance with some embodiments of the present disclosure.

A public area through which many people pass, such as an airport, bus terminal, or shopping mall, may be placed under video surveillance, whereby a video camera installed in the area records persons passing through the area. These recordings may be viewed by security or law-enforcement personnel in real-time, and/or during the course of investigative work following an incident.

In some cases, a viewer may locate a person-of-interest in one of the images of a recording. For example, following a terrorist attack, counter-terrorism personnel may locate, in one of the images, an individual who is suspected of having perpetrated the attack. The challenge is then to identify this person-of-interest, and/or to continue monitoring the person-of-interest even after the person-of-interest has left the area that is under video surveillance.

One way to address the above challenge is to identify an identifier, such as an IMSI or International Mobile Station Equipment Identity (IMEI), of a mobile communication terminal carried by the person-of-interest. To identify such an identifier, an interrogation device may be placed near the video camera, such that, at around the time that a person enters the area that is covered by the video camera, the identifier of his mobile communication terminal is captured by the interrogation device. Such a solution allows correlating, or associating, the video data from the video camera with the identifiers acquired from the corresponding interrogation device.

However, a challenge associated with the above-described solution is that many other people may be in the vicinity of the person-of-interest. For example, in a typical scenario, a large number of persons may exit an airplane, and enter an airport terminal, at approximately the same time. As the persons enter the terminal, an interrogation device may capture the mobile communication terminals belonging to these persons, and then obtain the identifiers of these terminals. At the same time, a video camera may record the entry into the terminal. Upon viewing the recording, in real-time or afterwards, monitoring personnel may notice a suspicious individual, and may seek to identify the identifier associated with this individual. However, given the large number of identifiers obtained by the interrogation device at around the time of the recording (due to the large number of persons entering the terminal together), there may not be a straightforward way to identify this particular individual's identifier.

Embodiments described herein therefore place, within the public area, a plurality of pairs of video cameras and interrogation devices, along various paths that a person-of-interest might be expected to move. The person-of-interest is then located in multiple images acquired, collectively, by multiple video cameras. From each of the interrogation devices that are paired with these video cameras, a subset of the captured identifiers is obtained, whereby the subset includes only those identifiers that were captured within a suitable interval of a time at which the person-of-interest was visible to the video camera that is paired with the interrogation device. The "candidate identifiers"—those identifiers that are determined to likely be associated with the person-of-interest—are then restricted to those identifiers that are included in each of the subsets, or at least in a certain number (or percentage) of the subsets. Alternatively or additionally, a given identifier may be rejected as a candidate identifier, in response to (i) the person-of-interest not having been visible, within a suitable interval of the time at which the identifier was obtained by a particular interrogation device, to the video camera that is paired with the interrogation device, and/or (ii) the person-of-interest having been visible, within a suitable interval of the time at which the identifier was obtained, to a video camera that is not paired with the interrogation device.

In order to automatically, and accurately, locate the person-of-interest in the images acquired by the "paired" video cameras, embodiments described herein provide a sufficient number of video cameras, some of which may be unpaired with interrogation devices, such as to provide continuous, or near-continuous, coverage of the area of interest. Due to this continuous or near-continuous coverage, a processor may utilize video-tracking techniques to automatically track the person-of-interest, such that the person-of-interest is not "lost." For example, the direction and/or speed at which the person-of-interest is moving in a first set of images, acquired by a first video camera, may be used to predict the next video camera to which the person-of-interest will be visible, and/or a range of times at which the person-of-interest will be visible to this next video camera. By virtue of utilizing such tracking techniques, the person-of-interest may be repeatedly located—quickly, automatically, and with minimal chance of a false detection—as he moves through the area, regardless of the route that the person-of-interest takes, and of the speed at which the person-of-interest moves.

Typically, to track the person-of-interest, a user first manually locates the person-of-interest in an image. The processor then extracts features of the person-of-interest, such as features relating to the body shape or clothing color of the person-of-interest, and uses these features to track the person-of-interest over other images acquired by the video cameras.

In summary, embodiments described herein identify an identifier of a mobile communication terminal carried by a person-of-interest by combining (i) the correlation of information received from multiple pairs of interrogation devices and video cameras, with (ii) video tracking.

SYSTEM DESCRIPTION

Introduction

Reference is initially made to FIG. 1, which is a schematic illustration of a system 20 for associating a person-of-interest with an identifier of a mobile communication terminal, such as a cellular phone, carried by the person-of-interest, in accordance with some embodiments of the present disclosure. System 20 comprises a plurality of video cameras, configured to acquire videos of persons of interest, and a plurality of interrogation devices, configured to obtain identifiers of mobile communication terminals. System 20 further comprises a processor 28, configured to associate the persons of interest with the identifiers, by processing data received from the video cameras and interrogation devices.

In the particular example shown in FIG. 1, five video cameras 24a, 24b, 24c, 24d, 24e, and three interrogation devices 26a, 26b, and 26c, are deployed within an airport terminal. Some of the video cameras—in particular, video cameras 24a, 24b, and 24e—cover areas of the airport terminal that are included within the coverage of respective interrogation devices. In other words, these video cameras are "paired" with respective interrogation devices. In the description below, such a video-camera-interrogation-device pair is referred to as a "device pair," in which there is at least some overlap between the coverage of the video camera and the coverage of the interrogation device. For example, in FIG. 1, the area of the airport terminal that is covered by video camera 24a is provided cellular coverage by interrogation device 26a, such that, around the time that a person is being recorded by video camera 24a, interrogation device 26a may obtain an identifier of the person's mobile communication terminal. Others of the video cameras—in particular, video cameras 24c and 24d—are not paired with any interrogation devices.

Although, for ease of illustration, each device pair is shown in FIG. 1 as a single physical unit, it is noted that, typically, the interrogation devices are physically separate from the video cameras. Moreover, a given interrogation device is not necessarily collocated with the video camera with which it is paired. For example, a video camera may be located at the far end of a corridor, while an interrogation device paired with the video camera may be located in the middle of the corridor. In some cases, an interrogation device may be paired with multiple video cameras, and vice versa. (In light of the above, it is noted that the term "video camera," as used herein, may include within its scope multiple video cameras that together provide coverage to a particular area; likewise for the term "interrogation device.") For example, if a given area that is provided cellular coverage by an interrogation device includes an L-shaped corridor, two video cameras may be paired with the interrogation device, a respective one of the video cameras being placed at the end of each branch of the corridor.

System 20 may comprise any suitable number of video cameras, and any suitable number of interrogation devices. Typically, the number of video cameras is relatively large, such as to provide continuous, or near-continuous, coverage. For example, although, for simplicity, FIG. 1 shows only a relatively small number of video cameras, system 20, when deployed in a large area such as an airport terminal, typically comprises tens, or even hundreds, of video cameras. In some embodiments, as in FIG. 1, some video cameras are not paired with interrogation devices; for example, of 100 video cameras deployed in an airport terminal, approximately 90 video cameras may be unpaired. In other embodiments, each video camera is paired with a respective interrogation device.

In capturing a mobile communication terminal, each interrogation device belonging to system 20 may use any suitable techniques known in the art. For example, the interrogation device may transmit a soliciting signal at a relatively high power level, and/or using directional antennas, such that the soliciting signal is received by the mobile communication terminal at an intensity that is greater than that of any signals received from the legitimate base stations belonging to the cellular network that serves the mobile communication terminal. Upon receiving such a soliciting signal, the mobile communication terminal (incorrectly) identifies the source of the signal—the interrogation device—as a base station of the cellular network. The mobile communication terminal then associates with the interrogation device, rather than with the base station with which the mobile communication terminal was previously associated.

Typically, each of the interrogation devices belonging to system 20 is configured to release a captured mobile communication terminal, immediately after obtaining the identifier of the mobile communication terminal. In some cases (e.g., for particular mobile communication terminals of interest), however, an interrogation device may act as a "man-in-the-middle," intermediating the exchange of communication between the mobile communication terminal and the cellular network with which the mobile communication terminal was previously associated. That is, from the perspective of the mobile communication terminal, the interrogation device mimics the behavior of a legitimate base station belonging to the cellular network, while from the perspective of the cellular network, the interrogation device mimics the behavior of the mobile communication terminal. To facilitate such intermediation of communication, each interrogation device typically comprises a plurality of transmitter-receivers (transceivers) and a plurality of modems. The transceivers imitate respective base stations of various cellular networks, while the modems behave as clones of respective captured mobile communication terminals. Communication between the transceivers and the mobile communication terminals may be exchanged via a first antenna, while communication between the modems and the cellular networks may be exchanged via a second antenna. A processor of the interrogation device drives the performance of the various functions of the interrogation device that are described herein.

Each of the identifiers obtained by an interrogation device is communicated to processor 28, and is then stored, by the processor, in association with the time, referred to herein as the "identifier-time," at which the identifier was obtained by the interrogation device. In some embodiments, the interrogation device communicates the identifier-time to the processor. Typically, however, the processor identifies the time of receipt of the identifier as the identifier-time. (Since, typically, the interrogation devices are configured to immediately communicate any obtained identifiers to the processor, there is typically only a negligible difference between the time at which an identifier was obtained by the interrogation device and the time at which the identifier was received by the processor.) Likewise, each of the images acquired by a video camera is communicated to processor 28, and is then stored, by the processor, in association with the time at which the image was acquired. Analogously to that which was described above, this time may be a timestamp communicated to the processor by the video camera, or, alternatively, the time of receipt of the image by the processor.

As described in detail below, by automatically tracking the person-of-interest over the images, the processor identifies a plurality of "visible-times," at each of which the person-of-interest was visible to one of the paired video cameras. Based on the identifier-times and the visible-times, the processor identifies at least one of the identifiers that is more likely than any of the other identifiers to belong to the mobile communication terminal carried by the person-of-interest.

In the particular configuration shown in FIG. 1, the first device pair, which includes video camera 24a and interrogation device 26a, is placed along the airplane exit route. As persons 43 exit the airplane and enter the terminal, video camera 24a acquires a video of the persons, while interrogation device 26a captures the persons' mobile communication terminals, and obtains identifiers of these mobile communication terminals. Identifiers that may be obtained by interrogation device 26a, and by other interrogation devices belonging to system 20, include IMSIs and IMEIs. An advantage of obtaining an IMEI, and associating this IMEI with the person of interest, is that the IMEI of a mobile communication terminal remains the same, even if the user of the mobile communication terminal changes the subscriber identification module (SIM) of the mobile communication terminal.

Also in the particular configuration shown in FIG. 1, the second pair of devices, which includes video camera 24b and interrogation device 26b, is located near the control checkpoints 46, at which persons entering the main body of the airport terminal may be required to present identifying documentation. Advantages of placing a second pair of devices at this location include the following:
  (i) The person-of-interest may have turned his mobile communication terminal on only after passing the area covered by the first pair of devices.
  (ii) The persons may walk toward the control checkpoints at different speeds, yielding a "decoupling" of mobile communication terminals. That is, by the time the person-of-interest reaches the control checkpoints, one or more mobile communication terminals that were near the person-of-interest earlier may no longer be near the person-of-interest. This decoupling facilitates identifying the identifier of the mobile communication terminal carried by the person-of-interest.
  (iii) Since the person-of-interest may slow down at the control checkpoints, it may be relatively easy to track the person-of-interest in the video acquired by video camera 24b.

Also in the particular configuration shown in FIG. 1, a third device pair, which includes video camera 24e and interrogation device 26c, is located near the exit 48 from the airport terminal. Since, by the time the person-of-interest reaches exit 48, the person-of-interest has most probably decoupled from everyone else who was previously in his vicinity (except, possibly, for persons traveling with him, such as family members), any identifier obtained by interrogation device 26c (within a suitable interval of the person-of-interest being visible to video camera 24e) that was also obtained by the preceding two interrogation devices (within a suitable interval of the person-of-interest being visible to the preceding video cameras) is likely to belong to the mobile communication terminal of the person-of-interest.

Processor 28 is typically connected to each of the interrogation devices and video cameras over a wired or wireless local area network (LAN). Processor 28 typically receives data from these devices via a network interface, which typically includes a network interface controller (NIC) 30. Processor 28 and NIC 30 may be disposed, for example, on a common server 32. Processor 28 is typically configured to display the acquired videos (e.g., on a computer monitor), in real-time and/or retrospectively, to users of system 20, such as law-enforcement or security personnel. Similarly, processor 28 may display any captured identifiers of mobile communication terminals, and/or any other relevant information, to users of the system. Processor 28 is further configured to accept inputs from users of the system; for example, as further described below, users may indicate to the processor that particular persons observed in the videos are persons of interest.

In general, processor 28 may be embodied as a single processor, or as a cooperatively networked or clustered set of processors. Processor 28 is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Video Tracking, and Correlating the Visible-Times with the Identifier-Times

Figure 2:
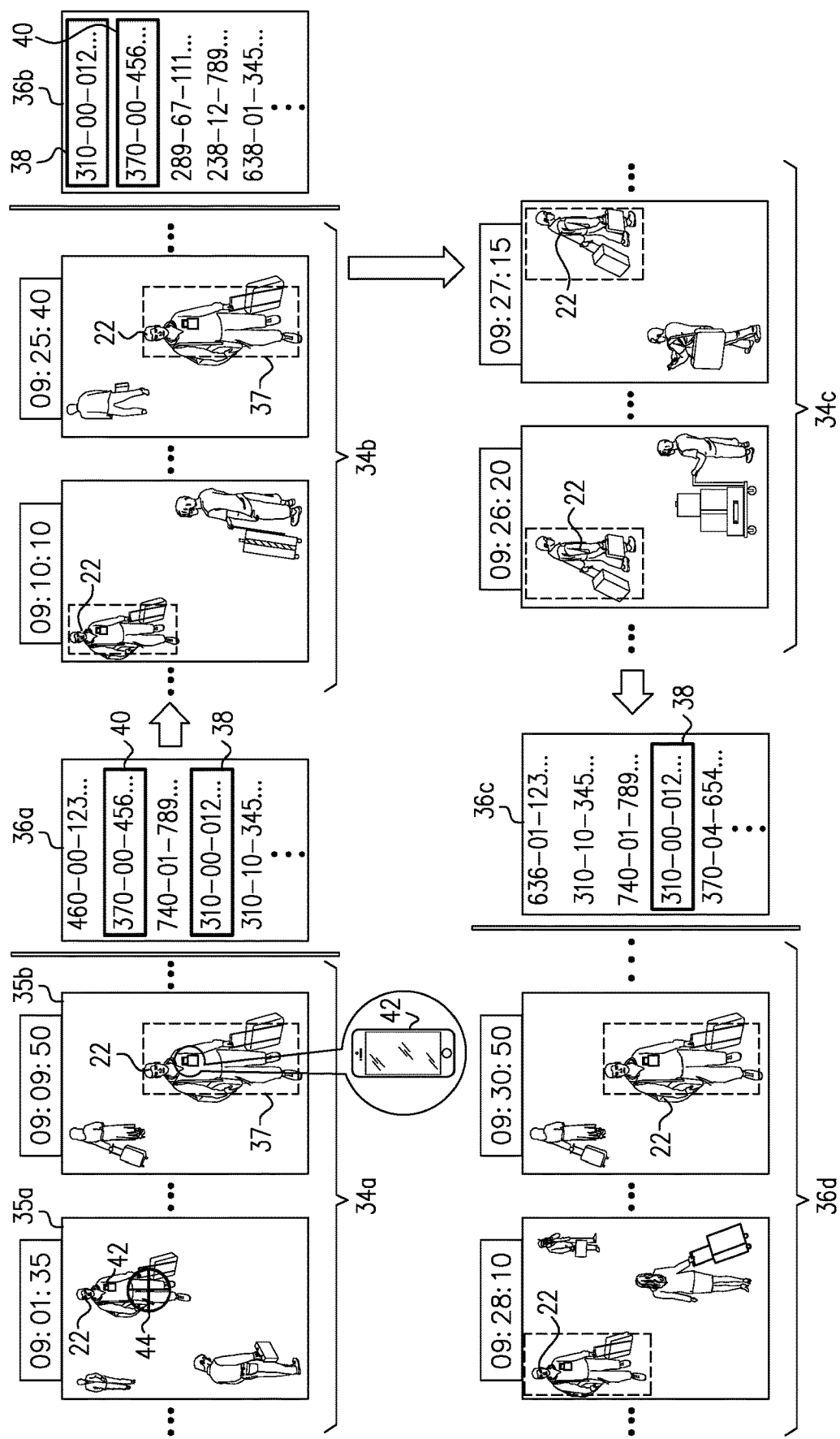
FIG. 2 is a schematic illustration of a method for associating a person-of-interest with an identifier of a mobile communication terminal, in accordance with some embodiments of the present disclosure.

Reference is now additionally made to FIG. 2, which is a schematic illustration of a method for associating a person-of-interest 22 with an identifier of a mobile communication terminal 42, in accordance with some embodiments of the present disclosure. In the below description of FIG. 2, it will be assumed that information received by processor 28 is processed retrospectively. However, it is noted that information received by processor 28 may alternatively or additionally be processed in real-time, mutatis mutandis.

FIG. 2 shows, at the top-left, a set 34a of images acquired by video camera 24a and received by processor 28. As described above, the processor may present these images for viewing. Upon viewing a particular person in an image 35a that was acquired at 9:01:35, a user may decide that the person is a person-of-interest 22. The user may then indicate to processor 28 that the person is a person-of-interest, by using a computer mouse to move an indicator 44 over the person and then clicking the mouse, or in any other suitable way.

In response to receiving this indication, processor 28 automatically tracks person-of-interest 22. First, typically, the processor extracts features of person-of-interest 22 that are exhibited in image 35a. For example, the processor may extract features relating to the body shape (e.g., height or width), or color of clothing, of person-of-interest 22. Typically, such features are invariant, at least to some extent, to the distance and angle from which the person-of-interest is viewed.

Next, the processor locates the person-of-interest in other images collectively acquired, before and/or after the image in which the person-of-interest was marked, by the video cameras belonging to system 20, by identifying the extracted features in these images. In general, the benefit of doing so is at least one, or both, of the following:

(i) Locating the person-of-interest in images acquired by a video camera that is paired with an interrogation device establishes at least some visible-times at which the person-of-interest was visible to the video camera. These visible-times may then be correlated with the identifier-times received from the interrogation device, such as to identify a subset of the received identifiers that are possibly associated with the person-of-interest. For example, the processor may identify the first visible-time at which the person-of-interest was visible to the video camera. The subset of identifiers may then include only those identifiers that were obtained within a particular interval (e.g., 30 seconds) of this first visible-time. Alternatively, the processor may include, in the subset of identifiers, any identifier that was obtained with a particular interval (e.g., 30 seconds) of any one of the visible-times.

For example, FIG. 2 assumes that the person-of-interest first became visible to video camera 26a in image 35a, acquired at 9:01:35. In response to the person-of-interest being marked in this image, the processor automatically locates the person-of-interest in the images of set 34a that follow image 35a. (The processor may also search backward, in the images that precede image 35a, to check if the person-of-interest is visible in these images.) The processor thus ascertains that the person-of-interest was visible to video camera 24a between 9:01:35 and 9:09:50, the time at which an image 35b was acquired. The processor may then identify a subset 36a of the identifiers received from interrogation device 26a that were obtained by interrogation device 26a at respective identifier-times (not shown) that are within, or sufficiently close to, this range of times. For example, each of the identifiers in subset 36a may have been obtained between 9:01:05 (30 seconds prior to 9:01:35) and 9:10:20 (30 seconds after 9:09:50).

(ii) Further to locating the person-of-interest in multiple images acquired by a video camera, the processor may use motion information extracted from these images to predict the next video camera to which the person-of-interest will be visible. This helps the processor track the person-of-interest, in the event that multiple routes are available to the person-of-interest. In other words, by processing at least some of the images that were acquired by a first video camera (and in which the person-of-interest was located), the processor may automatically identify that the person-of-interest is moving, in these images, toward a second video camera, and not, for example, toward a third video camera. The processor may then quickly process images acquired by the second video camera, and hence automatically, and accurately, locate the person-of-interest in these images. If, on the other hand, the processor did not know to look in the images acquired by the second video camera, the processor might locate the person-of-interest more slowly, or, even more disadvantageously, might mistakenly identify the person-of-interest in an image acquired by the third video camera.

Alternatively or additionally, the processor may use the motion information to predict an approximate time at which the person-of-interest will be visible to the next video camera. For example, the processor may, by processing a set of images acquired by a first video camera, automatically estimate a speed at which the person-of-interest is moving in these images. In response to the estimated speed, the processor may select a set of images that were acquired by a second video camera (toward which the person-of-interest is moving in the first set of images), and then look for the person-of-interest in this set. For example, the processor may estimate the earliest possible time at which, given the estimated speed, the person-of-interest may have reached the area of coverage of the second video camera, and then look for the person-of-interest in images that were acquired at, or subsequently to, this estimated time. If, on the other hand, the processor were to also process images acquired by the second video camera before this estimated time, the processor might locate the person-of-interest more slowly, or, even more disadvantageously, might produce a false detection.

The video cameras belonging to system 20 typically cover all, or at least the vast majority of, the area through which the person-of-interest moves. This ensures that processor 28 does not "lose" the person-of-interest, but rather, is able to track the person-of-interest from one video camera to the next, as described above. (The video cameras do not cover the interiors of any restrooms. However, as described below, following entry of the person-of-interest into a restroom, the processor may search the vicinity of the restroom doors, such as to identify the person-of-interest upon his exit from the restroom.) In some cases, the coverage of one video camera may overlap with that of another; such overlap further facilitates the tracking of the person-of-interest, as the person-of-interest moves from the coverage of one video camera to that of the next.

Typically, the processor indicates, to the user, the location of the person-of-interest in each of the relevant images. For example, FIG. 2 shows, in image 35b, a box 37 that is displayed by processor 28 around the person-of-interest. In response to this indication, the user may confirm that the tracking was performed correctly, or may alternatively re-indicate the person-of-interest to the processor in another image, to facilitate a better tracking.

In some embodiments, while performing the tracking, the processor may extract additional features that were not extracted previously, and/or may improve upon the original feature extraction. For example, as the person-of-interest approaches the video camera between image 35a and image 35b, certain features of the person-of-interest that were not previously visible may become visible. The processor may extract these additional features, and use them to facilitate locating the person-of-interest in other images. Moreover, while performing the tracking, the processor may take note of changed features. For example, the person-of-interest may remove, or don, a particular garment while moving through the airport. The processor may note this change in appearance, and update the searched feature set accordingly, such as to successfully find the person-of-interest in subsequent images.

FIG. 2 also shows a set 34b of images received from video camera 24b. The processor processes these images, such as to automatically locate the person-of-interest in these images. (FIG. 2 shows the first and last images of set 34b in which the person-of-interest was located, and further shows the respective times at which these images were acquired.) Typically, the processor locates the person-of-interest by identifying, in the images belonging to set 34b, the features that were extracted from set 34a.

As described above, in some embodiments, the processor derives motion information from set 34a, and uses this information to identify set 34b from a larger set of images acquired by video camera 24b, such that the processor may look for the person-of-interest only in this smaller set of images. For example, based on the speed at which the person-of-interest was seen to be moving in set 34a, the processor may identify a range of times during which the person-of-interest was likely to have been within view of video camera 24b. The processor may then begin looking for the person-of-interest in those images that were acquired by video camera 24b within this range of times. (If the person-of-interest is not found in these images, the processor may then process other images acquired by video camera 24b.) This technique may help the processor locate the person-of-interest more quickly, and/or reduce the likelihood of incorrectly identifying another person as the person-of-interest.

By automatically locating the person-of-interest in one or more images belonging to set 34b, the processor ascertains one or more visible-times at which the person-of-interest was visible to video camera 24b. Then, the processor identifies a subset 36b of identifiers that were obtained by interrogation device 26b within a suitable interval of one of these visible-times. For example, assuming that the person-of-interest was visible to video camera 24b between 9:10:10 and 9:25:40, as indicated in the figure, subset 36b may contain only those identifiers that were obtained by interrogation device 26b within 30 seconds of 9:10:10, the first time at which the person-of-interest was visible.

(It is noted that the gap between the last time at which the person-of-interest was visible to video camera 24a—9:09:50—and the first time at which the person-of-interest was visible to video camera 24b—9:10:10—is relatively small. This is because typically, as described above, the coverage of the video cameras is continuous or nearly-continuous, such that the processor does not lose the person-of-interest.)

In some embodiments, the processor uses the identifier-times to locate the person-of-interest more quickly, and/or reduce the likelihood of incorrectly identifying another person as the person-of-interest. For example, the processor may first look for the person-of-interest in images that were acquired, by video camera 24b, within a suitable interval of an identifier-time at which an identifier belonging to subset 36a was obtained by interrogation device 26b. Only if the person-of-interest is not found in these images, may the processor proceed to look for the person-of-interest in other images acquired by video camera 24b.

In some cases, the person-of-interest may take any one of multiple routes, and may move at any speed, in moving through the area of interest. For example, in the particular scenario depicted in FIG. 2, to reach the exit 48 of the airport terminal, the person-of-interest may follow a first route that runs alongside baggage carousels 50, or a second route that runs alongside restrooms 52. Moreover, in some cases, there may be more than one exit potentially useable by the person-of-interest. Hence, embodiments of the present disclosure typically provide a sufficient number of video cameras, such that the person-of-interest is nearly always visible to at least one of the video cameras. Typically, many of these video cameras are unpaired. (Although these video cameras do not directly help with the "correlating" aspect of the present disclosure, they help with the "tracking" aspect.) System 20 may comprise any suitable number of such unpaired video cameras, which may be placed at any suitable locations. For example, FIG. 2 shows two unpaired video cameras 24c and 24d, each of these video cameras being located along a respective one of the two routes described above.

The processor may thus track the person-of-interest, over images acquired, collectively, by the plurality of video cameras, as the person-of-interest heads, in the acquired images, toward exit 48. For example:

(i) Based on motion of the person-of-interest observed in set 34b, acquired by video camera 24b, the processor may deduce that the person-of-interest headed toward video camera 24c, rather than toward video camera 24d. The processor may further deduce a range of times at which the person-of-interest is expected to have been within view of video camera 24c. The processor may therefore identify a set 34c of images acquired by video camera 24c that are likely to show the person-of-interest. The processor may then look for the person-of-interest in set 34c. FIG. 2 shows a subset of this set, which includes images acquired between 9:26:20 and 9:27:15, in which the person-of-interest was located by the processor.

(ii) In response to motion of the person-of-interest exhibited in set 34c, the processor may estimate a range of times at which the person-of-interest is likely to have reached exit 48. Based on this range of times, the processor may process the relevant set 34d of images acquired by video camera 24e. FIG. 2 shows a subset of this set, ranging from the visible-time of 9:28:10 to the visible-time of 9:30:50, in which the person-of-interest was located by the processor. FIG. 2 also shows a subset 36c of identifiers that were obtained by interrogation device 26c within a suitable interval of one or more of these visible-times.

While tracking the person-of-interest, the processor may identify that the person-of-interest has moved outside the coverage of the video cameras. The processor may therefore predict a location in which the person-of-interest will next be visible to a video camera, and/or an approximate time at which the person-of-interest will next be visible to a video camera, such as to quickly and accurately detect the person-of-interest upon the person-of-interest reentering the coverage of the video cameras. For example, the processor may identify that the person-of-interest has entered restroom 52. In response thereto, the processor may search succeeding images, in the region of the restroom doors, such as to detect the person-of-interest upon the exit of the person-of-interest from the restroom.

In some embodiments, processor 28 learns from the behavior of a user of system 20, such as to improve the automatic video tracking. For example, the processor may observe that the user, when tracking a particular person, typically loads, and observes, images acquired by video camera 24c immediately after observing images acquired by video camera 24b. (For example, the user may know, from experience, that the majority of people clearing control checkpoints 46 head toward baggage carousels 50.) In response thereto, the processor, when tracking a person-of-interest leaving the coverage of video camera 24b, may first look for the person-of-interest in images acquired by video camera 24c, unless the images from video camera 24b give a strong indication that the person-of-interest is heading in a different direction.

Correlating the Subsets of Identifiers

The procedure described above yields a plurality of subsets of identifiers. Each of the identifiers in these subsets possibly belongs to mobile communication terminal 42 of the person-of-interest, in that, as described above, each of these identifiers was obtained by an interrogation device within a particular interval of one of the visible-times at which the person-of-interest was visible to the video camera that is paired with the interrogation device. In the example shown in FIG. 2, there are three such subsets: subset 36a, subset 36b, and subset 36c.

To identify at least one identifier that is more likely than any of the other identifiers to belong to mobile communication terminal 42, the processor correlates (or "intersects") the subsets with each other, such as to identify those identifiers that are common to at least some (e.g., a particular threshold number, or percentage) of the subsets.

For example, in FIG. 2, there are two identifiers common to both subset 36a and subset 36b: a first identifier 38, having the value 310-00-012 . . . , and a second identifier 40, having the value 370-00-456 . . . . Only one of these identifiers, however—identifier 38—also belongs to subset 36c. The processor may therefore ascertain that identifier 38 is more likely than identifier 40, and identifier 40 is more likely than any of the other identifiers, to belong to mobile communication terminal 42.

As described above, it is possible that the identifier of mobile communication terminal 42 was not captured by a particular interrogation device, due to the mobile communication terminal having been off, or due to a "miss" by the interrogation device. Therefore, the processor typically does not require that an identifier be included in all of the subsets. For example, even an identifier that is included in only 75% of the subsets may be identified by the processor as having a high likelihood of belonging to the mobile communication terminal.

Typically, the identification of the identifier of mobile communication terminal 42 is facilitated by the consideration of "negative evidence," by which the processor ascertains that at least one of the other identifiers is unlikely to belong to mobile communication terminal 42. For example, further to ascertaining that (i) the person-of-interest was not visible to a video camera within a particular interval of an identifier-time at which a given identifier was obtained by the interrogation device that is paired with the video camera, and/or (ii) the person-of-interest was visible, within a particular interval of the identifier-time, to a video camera that is not paired with the interrogation device, the processor may deduce that the given identifier is likely not associated with the person-of-interest. For example, if a given identifier was obtained by interrogation device 26c at 9:32:00, but the person-of-interest was not visible to video camera 24e, and/or was visible to video camera 24a, within a suitable interval of 9:32:00, the processor may conclude that the given identifier is unlikely to be associated with the person-of-interest.

In response to identifying the at least one identifier that is more likely than the others to belong to mobile communication terminal 42, the processor generates an output that includes the at least one identifier. For example, the processor may generate a visual output that indicates that the at least one identifier has a high likelihood of being associated with the person of interest. Typically, the processor calculates a likelihood for each identifier, e.g., based on the number of subsets in which the identifier was contained, and ranks the identifiers, based on their respective likelihoods. For example, based on the data shown in FIG. 2, the processor may generate an output such as:

"Candidate Identifiers:
1) 310-00-012 . . .
2) 370-00-456 . . . "

Typically, alternatively or additionally to generating a visual output as described above, the processor generates an output message to a database, that causes an image, and/or other known properties, of the person-of-interest to be stored in the database in association with the identified identifier(s).

Alternatively to an airport terminal, system 20 may be deployed in any suitable area, such as, for example, a shopping mall. As another example, system 20 may be deployed across a mass transportation system. For example, system 20 may comprise pairs of devices deployed in various stations (e.g., bus and/or subway stations), and video cameras deployed within the vehicles that travel between these stations. Persons-of-interest may then be tracked as they travel between the stations, this tracking facilitating the correlation of information from the various pairs of devices.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
   a network interface; and
   a processor, configured to:
      receive, via the network interface, a plurality of identifiers of mobile communication terminals that were obtained, collectively, by a plurality of interrogation devices at respective identifier-times,
         each interrogation device of the interrogation devices being paired with a respective one of at least some of a plurality of video cameras
      by tracking a person-of-interest over a plurality of images that were acquired, collectively, by the plurality of video cameras, identify a plurality of visible-times, at each of which the person-of-interest was visible to one of the at least some of the video cameras,
      based on the visible-times and the identifier-times, identify at least one of the identifiers that belongs to one of the mobile communication terminals that is carried by the person-of-interest, and
      generate an output that includes the at least one of the identifiers.

2. The system according to claim 1, wherein the processor is further configured to receive, from a user, an indication that a person appearing in one of the images is the person-of-interest, and wherein the processor is configured to track the person-of-interest responsively to the indication.

3. The system according to claim 2, wherein the processor is configured to track the person-of-interest by:
   extracting features of the person-of-interest from the one of the images, and
   tracking the person-of-interest by identifying the features in others of the images.

4. The system according to claim 1, wherein the processor is configured to track the person-of-interest by:
   by processing at least some of the images that were acquired by a first one of the video cameras, identifying that the person-of-interest is moving, in the at least some of the images that were acquired by the first one of the video cameras, toward a second one of the video cameras, and
   in response thereto, processing at least some of the images that were acquired by the second one of the video cameras, such as to locate the person-of-interest in the at least some of the images that were acquired by the second one of the video cameras.

5. The system according to claim 1, wherein the processor is configured to track the person-of-interest by:
   by processing at least some of the images that were acquired by a first one of the video cameras, estimating a speed at which the person-of-interest is moving in the at least some of the images that were acquired by the first one of the video cameras,
   in response to the estimated speed, selecting a subset of images that were acquired by a second one of the video cameras, and
   processing the subset, such as to locate the person-of-interest in the subset.

6. The system according to claim 1, wherein the processor is configured to identify the at least one of the identifiers in response to the at least one of the identifiers having been obtained, from each interrogation device of at least some of the interrogation devices, within a particular interval of any one of the visible-times at which the person-of-interest was visible to the one of the video cameras that is paired with the interrogation device.

7. The system according to claim 6, wherein the processor is configured to identify the at least one of the identifiers in response to the at least one of the identifiers having been obtained, from each interrogation device of at least some of the interrogation devices, within a particular interval of a first one of the visible-times at which the person-of-interest was visible to the one of the video cameras that is paired with the interrogation device.

8. The system according to claim 1, wherein the processor is configured to identify the at least one of the identifiers by ascertaining that at least one of the other identifiers is unlikely to belong to the one of the mobile communication terminals that is carried by the person-of-interest.

9. The system according to claim 8, wherein the processor is configured to ascertain that the at least one of the other identifiers is unlikely to belong to the one of the mobile communication terminals that is carried by the person-of-interest by ascertaining that the person-of-interest was not visible to one of the video cameras within a particular interval of one of the identifier-times at which the at least one of the other identifiers was obtained by one of the interrogation devices that is paired with the one of the video cameras.

10. The system according to claim 8, wherein the processor is configured to ascertain that the at least one of the other identifiers is unlikely to belong to the one of the mobile communication terminals that is carried by the person-of-interest by ascertaining that the person-of-interest was visible to one of the video cameras within a particular interval of one of the identifier-times at which the at least one of the other identifiers was obtained by one of the interrogation devices that is not paired with the one of the video cameras.

11. A method, comprising:
   receiving, by a processor, a plurality of identifiers of mobile communication terminals that were obtained, collectively, by a plurality of interrogation devices at respective identifier-times, each interrogation device of the interrogation devices being paired with a respective one of at least some of a plurality of video cameras;

by automatically tracking a person-of-interest over a plurality of images that were acquired, collectively, by the plurality of video cameras, identifying a plurality of visible-times, at each of which the person-of-interest was visible to one of the at least some of the video cameras;

based on the visible-times and the identifier-times, identifying at least one of the identifiers that belongs to one of the mobile communication terminals that is carried by the person-of-interest; and generating an output that includes the at least one of the identifiers.

12. The method according to claim 11, further comprising receiving, from a user, an indication that a person appearing in one of the images is the person-of-interest, and wherein automatically tracking the person-of-interest comprises automatically tracking the person-of-interest responsively to the indication.

13. The method according to claim 12, wherein automatically tracking the person-of-interest comprises:

extracting features of the person-of-interest from the one of the images, and automatically tracking the person-of-interest by identifying the features in others of the images.

14. The method according to claim 11, wherein automatically tracking the person-of-interest comprises:

by processing at least some of the images that were acquired by a first one of the video cameras, automatically identifying that the person-of-interest is moving, in the at least some of the images that were acquired by the first one of the video cameras, toward a second one of the video cameras, and in response thereto, processing at least some of the images that were acquired by the second one of the video cameras, such as to automatically locate the person-of-interest in the at least some of the images that were acquired by the second one of the video cameras.

15. The method according to claim 11, wherein automatically tracking the person-of-interest comprises:

by processing at least some of the images that were acquired by a first one of the video cameras, automatically estimating a speed at which the person-of-interest is moving in the at least some of the images that were acquired by the first one of the video cameras, in response to the estimated speed, selecting a subset of images that were acquired by a second one of the video cameras, and processing the subset, such as to automatically locate the person-of-interest in the subset.

16. The method according to claim 11, wherein identifying the at least one of the identifiers comprises identifying the at least one of the identifiers in response to the at least one of the identifiers having been obtained, from each interrogation device of at least some of the interrogation devices, within a particular interval of any one of the visible-times at which the person-of-interest was visible to the one of the video cameras that is paired with the interrogation device.

17. The method according to claim 16, wherein identifying the at least one of the identifiers comprises identifying the at least one of the identifiers in response to the at least one of the identifiers having been obtained, from each interrogation device of at least some of the interrogation devices, within a particular interval of a first one of the visible-times at which the person-of-interest was visible to the one of the video cameras that is paired with the interrogation device.

18. The method according to claim 11, wherein identifying the at least one of the identifiers comprises identifying the at least one of the identifiers by ascertaining that at least one of the other identifiers is unlikely to belong to the one of the mobile communication terminals that is carried by the person-of-interest.

19. The method according to claim 18, wherein ascertaining that the at least one of the other identifiers is unlikely to belong to the one of the mobile communication terminals that is carried by the person-of-interest comprises ascertaining that the at least one of the other identifiers is unlikely to belong to the one of the mobile communication terminals that is carried by person-of-interest by ascertaining that the person-of-interest was not visible to one of the video cameras within a particular interval of one of the identifier-times at which the at least one of the other identifiers was obtained by one of the interrogation devices that is paired with the one of the video cameras.

20. The method according to claim 18, wherein ascertaining that the at least one of the other identifiers is unlikely to belong to the one of the mobile communication terminals that is carried by the person-of-interest comprises ascertaining that the at least one of the other identifiers is unlikely to belong to the one of the mobile communication terminals that is carried by the person-of-interest by ascertaining that the person-of-interest was visible to one of the video cameras within a particular interval of one of the identifier-times at which the at least one of the other identifiers was obtained by one of the interrogation devices that is not paired with the one of the video cameras.

* * * * *